United States Patent [19]
Akatsu et al.

[11] Patent Number: 4,982,979
[45] Date of Patent: Jan. 8, 1991

[54] ACTIVE SUSPENSION SYSTEM WITH ENHANCED RESPONSE CHARACTERISTICS HYDRAULIC CIRCUIT

[75] Inventors: Yohsuke Akatsu; Naoto Fukushima; Yukio Fukunaga; Itaru Fujimura; Masaharu Satoh; Kensuke Fukuyama; Kenro Takahashi; Masahiro Tsukamoto, all of Kanagawa, Japan

[73] Assignee: Nissan Motor Company, Limited, Yokohama, Japan

[21] Appl. No.: 454,785

[22] Filed: Dec. 26, 1989

[30] Foreign Application Priority Data

Dec. 26, 1988 [JP] Japan ................. 62-328499
Aug. 31, 1989 [JP] Japan ................. 1-225578

[51] Int. Cl.⁵ .............................. B60G 17/00
[52] U.S. Cl. ................................. 280/707
[58] Field of Search ........................ 280/707

[56] References Cited

U.S. PATENT DOCUMENTS

| | | | |
|---|---|---|---|
| 4,702,490 | 10/1987 | Yamaguchi et al. | 280/707 |
| 4,717,173 | 1/1988 | Sugasawa et al. | 280/707 |
| 4,730,843 | 3/1988 | Tanaka et al. | 280/707 |
| 4,765,649 | 8/1988 | Ikemoto et al. | 280/707 |

FOREIGN PATENT DOCUMENTS

| | | |
|---|---|---|
| 0283004 | 9/1988 | European Pat. Off. . |
| 0284053 | 9/1988 | European Pat. Off. . |
| 0285153 | 10/1988 | European Pat. Off. . |
| 0218721 | 6/1989 | European Pat. Off. . |
| 0318932 | 6/1989 | European Pat. Off. . |

Primary Examiner—Kenneth R. Rice
Attorney, Agent, or Firm—Foley & Lardner, Schwartz, Jeffery, Schwaab, Mack, Blumenthal & Evans

[57] ABSTRACT

A hydraulic circuit for an active suspension system employs a pressure accumulator connected to a drain line at an orientation upstream of a pilot operated operational one-way check valve. The pressure accumulator absorbs back pressure generated in the drain line due to flow resistance in the drain line.

19 Claims, 11 Drawing Sheets

ACTIVE SUSPENSION SYSTEM WITH ENHANCED RESPONSE CHARACTERISTICS HYDRAULIC CIRCUIT

BACKGROUND OF THE INVENTION

1. Field of the Invention

The present invention relates generally to an active suspension system for an automotive vehicle for achieving satisfactory riding comfort and driving stability. More specifically, the invention relates to a hydraulic circuit for the active suspension system, which hydraulic circuit is enhanced in response characteristics in adjustment of fluid pressure in a working chamber.

2. Description of the Background Art

U.S. Pat. No. 4,702,490, issued on Oct. 27, 1987 which has been assigned to the common owner to the present invention, discloses one of typical construction of an actively controlled suspension system, in which a hydraulic cylinder defining a working chamber is disposed between a vehicular body and a suspension member rotatably supporting a vehicular wheel. The working chamber of the hydraulic cylinder is communicated with a hydraulic circuit including a pressurized working fluid source. A pressure control valve, such as an proportioning valve assembly, is disposed in the hydraulic circuit, which is connected to an electric or electronic control circuit to be controlled the valve position. The pressure control valve is controlled the valve position by a suspension control signal produced in the control circuit for adjusting pressure in the working chamber and whereby controlling suspension characteristics.

On the other hand, European Pat. Nos. 0 283 004, 0 285 153 and 0 284 053 discloses technologies for controlling the suspension systems constructed as set forth above, depending upon the vehicle driving condition for suppressing rolling and/or pitching of the vehicular body.

In one of the typical construction of the hydraulic circuit includes a pressure source unit which comprises a fluid pump drivingly associated with an automotive internal combustion engine so as to be driven by the engine output torque. The fluid pump is generally rated to produce rated pressure which is selected in view of the required line pressure in a supply line for supplying the pressurized fluid to the working chamber, at the minimum revolution speed of the engine so that the working fluid pressure to be supplied to the working chamber of the hydraulic cylinder can be satisfactorily high at any engine driving range. As will be appreciated, the output pressure of the fluid pump increases according increasing of the engine revolution speed. Therefore, at high engine revolution speed range, excessive pressure in excess of a predetermined maximum line pressure is relieved via a relief valve. Therefore, the engine output can be wasted to degrade engine driving performance as a power plant for the automotive vehicle and thus degrade fuel economy.

On the other hand, in the practical operation of the active suspension system, the fluid pressure in the working chamber in the hydraulic cylinder can be maintained at constant value for maintaining a desired vehicular height, at substantially low vehicle speed range or while the vehicle is not running. Despite this fact, the prior proposed hydraulic circuits for the actively controlled suspension systems supply the rated pressure of the fluid pump which should be higher than a minimum line pressure required for adjustment of the fluid pressure in the working chamber. In order to maintain the rated pressure to be output from the fluid pump, substantial engine output will be consumed even at the low vehicle speed range, in which the line pressure is not required for no possibility of adjustment of the suspension characteristics.

Improvement in the hydraulic circuit for the prior proposed active suspension system has been proposed in the co-pending U.S. patent application Ser. No. 331,602, filed on Mar. 31, 1989, which application has been commonly assigned to the common assignee to the present invention. The corresponding invention to the above-identified co-pending U.S. patent application has been published as Japanese Patent First (unexamined) Publication (Tokkai) Heisei 1-249509, published on Oct. 4, 1989. The prior invention has been directed to a hydraulic circuit for an actively controlled suspension system which employs first and second pressure relief valves disposed in a hydraulic pressure source circuit for relieving excessive pressure. The second pressure relief valve is provided a lower relief pressure than that of the first pressure relief valve. Means for selectively connecting and disconnecting the second pressure relief valve is disposed in the hydraulic pressure source circuit at an orientation upstream of the second pressure relief valve. The means is positioned at shut-off position to disconnect the second pressure relief valve when a vehicle traveling speed is higher than a predetermined speed. The means is responsive to the vehicle speed lower than the predetermined speed for establishing connection between a pressurized fluid source to the second relief valve for relieving the pressure at lower level than that established when the vehicle speed is higher than the predetermined speed.

Furthermore, the prior proposed invention includes a pilot pressure operated operational one-way check valve in a drain line for regulating line pressure to be supplied to a pressure control valve which adjusts fluid pressure in a working chamber in a hydraulic cylinder disposed between a vehicle body and a suspension member rotatably supporting a road wheel, by draining excessive line pressure. Similar hydraulic circuit constructions have also been disclosed in European Patent First Publications Nos. 0 318 721, 0 318 932, for example.

Such prior proposed hydraulic circuit does provide improved characteristics for the active suspension system in certain aspect. However, the prior proposed system still encounters a drawback in response characteristics of the pressure control valve unit by the presence of back pressure due to flow resistance in the drain line.

SUMMARY OF THE INVENTION

Therefore, it is an object of the present invention to provide a hydraulic circuit for an active suspension system, which can successfully absorb the back pressure and thus can avoid influence of the back pressure for the response characteristics of a pressure control valve.

In order to accomplish aforementioned and other objects, a hydraulic circuit for an active suspension system, according to the present invention, employs a pressure accumulator connected to a drain line at an orientation upstream of a pilot operated operational one-way check valve. The pressure accumulator absorbs back pressure generated in the drain line due to flow resistance in the drain line.

According to one aspect of the invention, an actively controlled suspension system comprises:

a hydraulic cylinder disposed between a vehicle body and a suspension member rotatably supporting a vehicular wheel, the hydraulic cylinder defining therein a working chamber;

a pressure source means including a pump means associated with an automotive internal combustion engine to be driven by the output of the engine;

a pressure control valve means having a first port connected to the working chamber, a second port connected to the pressure source means via a supply line and a third port connected to the pressure source means via a drain line, the pressure control valve means being variable of valve position for selectively establishing and blocking fluid communication between the first port and the second port and between the first port and the third port for adjusting fluid pressure in the working chamber for controlling suspension characteristics; and means for absorbing back pressure in the drain line.

Preferably, the active suspension system further comprises check valve means for disposed in the drain line and connected to the supply line for establishing fluid communication through the drain line when a line pressure in the supply line is held higher than or equal to a set pressure.

On the other hand, the back pressure absorbing means may be provided between the pressure control valve means and the check valve means. The back pressure absorbing means may comprise a pressure accumulator.

In the preferred construction, the check valve means comprises a pilot pressure operated operational one-way check valve, which has a pilot chamber to which the line pressure in the supply line is introduced for selectively establishing and blocking fluid communication through the drain line. In such case, the operational one-way check valve may define an inlet port connected to the pressure control valve via a first section of the drain line and an outlet port connected to a fluid reservoir in the pressure source, the operational one-way check valve further defining a communication path means for selectively establishing and blocking fluid communication between the pilot chamber and the inlet port. The operational one-way check valve may also include a valve member movable between a first position for establishing fluid communication between the inlet and outlet ports of the check valve and a second position for blocking fluid communication between the inlet and outlet ports of the check valve, and the fluid communication path means establishes fluid communication between the pilot chamber and the inlet port when the valve member is in the second position and blocks fluid communication between the pilot chamber and the inlet port when the valve member is in the first position.

In the further preferred construction, the active suspension system may further comprise a control unit associated with at least one sensor for monitoring preselected vehicle driving parameter, the control unit deriving a control signal for the pressure control valve means for operating the latter in a magnitude corresponding thereto, the control unit maintains operation for a given period of time after shutting down of main power supply.

According to another aspect of the invention, an actively controlled suspension system comprises:

a first hydraulic cylinder disposed between a vehicle body and a first suspension member rotatably supporting a first vehicular wheel, the first hydraulic cylinder defining therein a first working chamber;

a second hydraulic cylinder disposed between a vehicle body and a second suspension member rotatably supporting a second vehicular wheel, the second hydraulic cylinder defining therein a second working chamber;

a pressure source means including a pump means associated with an automotive internal combustion engine to be driven by the output of the engine;

a first pressure control valve means having a first port connected to the working chamber, a second port connected to the pressure source means via a supply line and a third port for draining pressurized fluid, the first pressure control valve means being variable of valve position for selectively establishing and blocking fluid communication between the first port and the second port and between the first port and the third port for adjusting fluid pressure in the working chamber for controlling suspension characteristics; and a second pressure control valve means having a first port connected to the working chamber, a second port connected to the pressure source means via a supply line and a third port for draining pressurized fluid, the second pressure control valve means being variable of valve position for selectively establishing and blocking fluid communication between the first port and the second port and between the first port and the third port for adjusting fluid pressure in the working chamber for controlling suspension characteristics; and a drain line connected to a fluid reservoir in the pressure source means a common line commonly connecting the third ports of the first and second pressure control valve means to the drain line; and means, connected to the common line, for absorbing back pressure in the drain line.

According to a further aspect of the invention, in a hydraulic circuit for an actively controlled suspension system including a hydraulic cylinder disposed between a vehicle body and a suspension member rotatably supporting a vehicular wheel, the hydraulic cylinder defining therein a working chamber; a pressure source means including a pump means associated with an automotive internal combustion engine to be driven by the output of the engine, and a pressure control valve means having a first port connected to the working chamber, a second port connected to the pressure source means via a supply line and a third port connected to the pressure source means via a drain line, the pressure control valve means being variable of valve position for selectively establishing and blocking fluid communication between the first port and the second port and between the first port and the third port for adjusting fluid pressure in the working chamber for controlling suspension characteristics, a check valve means disposed in the drain line and connected to the supply line, for establishing fluid communication through the drain line when a line pressure in the supply line is held higher than or equal to a set pressure, comprising a pilot pressure operated operational one-way check valve, which has a pilot chamber to which the line pressure in the supply line is introduced for selectively establishing and blocking fluid communication through the drain line, which operational one-way check valve defines an inlet port connected to the pressure control valve via a first section of the drain line and an outlet port connected to a fluid reservoir in the pressure source, the operational one-way check valve further defining a communication path means for selectively establishing and blocking fluid communication between the pilot chamber and the inlet port.

According to a still further aspect of the invention, in a hydraulic circuit for an actively controlled suspension system including a hydraulic cylinder disposed between a vehicle body and a suspension member rotatably supporting a vehicular wheel, the hydraulic cylinder defining therein a working chamber; a pressure source means including a pump means associated with an automotive internal combustion engine to be driven by the output of the engine, and a pressure control valve means having a first port connected to the working chamber, a second port connected to the pressure source means via a supply line and a third port connected to the pressure source means via a drain line, the pressure control valve means being variable of valve position for selectively establishing and blocking fluid communication between the first port and the second port and between the first port and the third port for adjusting fluid pressure in the working chamber for controlling suspension characteristics, a check valve means disposed in the drain line and connected to the supply line, for establishing fluid communication through the drain line when a line pressure in the supply line is held higher than or equal to a set pressure, comprising a pilot pressure operated operational one-way check valve, which has a pilot chamber to which the line pressure in the supply line is introduced for selectively establishing and blocking fluid communication through the drain line, which operational one-way check valve defines an inlet port connected to the pressure control valve via a first section of the drain line and an outlet port connected to a fluid reservoir in the pressure source, and has manually operable means for manually establishing fluid communication between the inlet port and outlet port.

BRIEF DESCRIPTION OF THE DRAWINGS

The present invention will be understood from the detailed description given herebelow and from the accompanying drawings of the preferred embodiments of the invention, which, however, should not be taken for limiting the invention to the specific embodiments, but are for explanation and understanding only.

In the drawings.

DESCRIPTION OF THE PREFERRED EMBODIMENT

Figure 1:
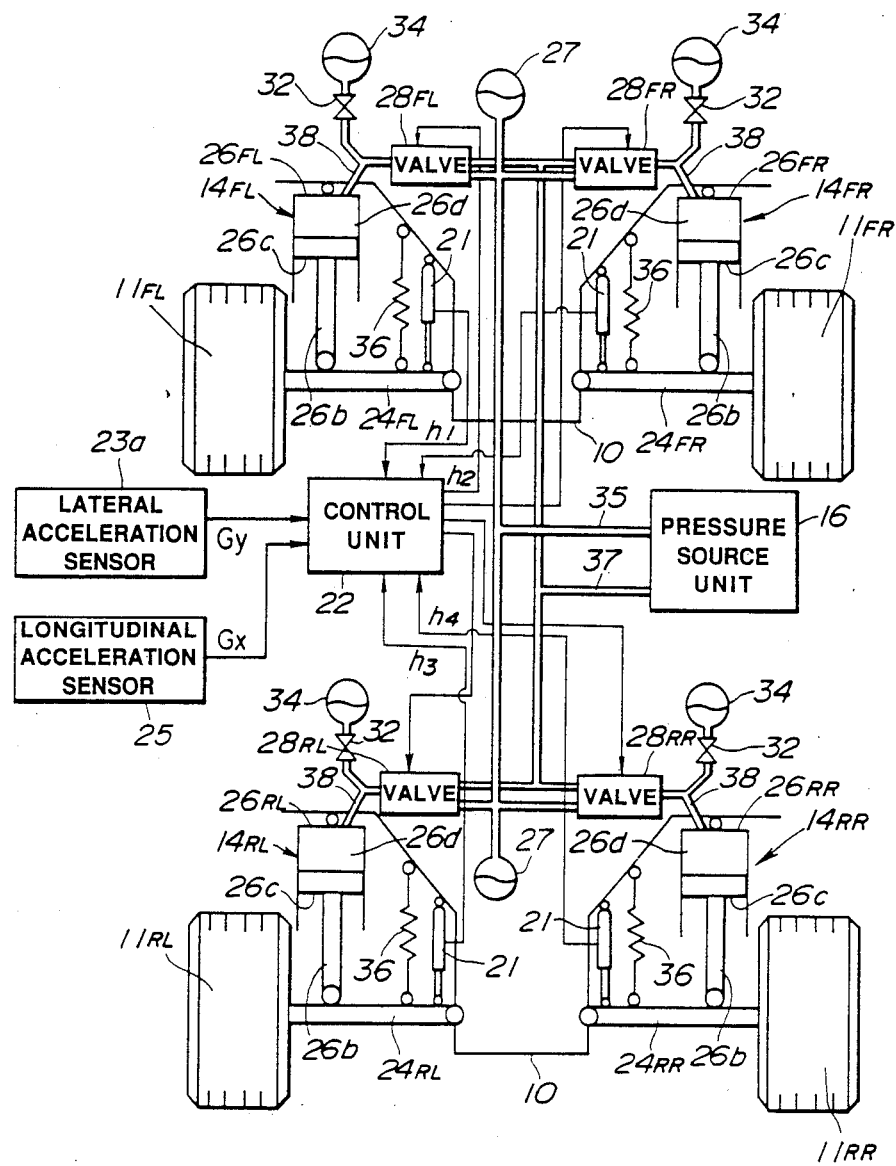
FIG. 1 is a diagrammatical illustration of the overall construction of the preferred embodiment of an active suspension system, according to the present invention, in which the preferred embodiment of a proportioning valve assembly is employed as a pressure control valve.

Referring now to the drawings, particularly to FIG. 1, the preferred embodiment of an active suspension system, according to the present invention, is designed to generally perform suspension control for regulating vehicular height level and vehicular attitude by suppressing relative displacement between a vehicular body 10 and suspension members 24FL, 24FR, 24RL and 24RR provided in front-left, front-right, rear-left and rear-right suspension mechanism 14FL, 14FR, 14RL and 14RR and rotatably supporting front-left, front-right, rear-left and rear-right wheels 11FL, 11FR, 11RL and 11RR. The suspension member will be hereafter represented by the reference numeral "24" as generally referred to. Similarly, the suspension mechanism as generally referred to will be hereafter represented by the reference numeral "14" Respective front-left, front-right, rear-left and rear-right suspension mechanisms 14FL, 14FR, 14RL and 14RR have hydraulic cylinders 26FL, 26FR, 26RL and 26RR which will be represented by the reference numeral "26" as generally referred to.

Each of the hydraulic cylinder 26 is disposed between the vehicular body 10 and the suspension member 24 to produce a dampling force for suppressing relative displacement between the vehicular body and the suspension member. The hydraulic cylinder 26 generally comprises an essentially enclosed cylindrical cylinder body 26a defining therein an enclosed chamber. A thrusting piston 26c is thrustingly and slidably disposed within the enclosed chamber of the hydraulic cylinder 26 for defining in the latter a working chamber 26d and a reference pressure chamber 26e. The working chamber 26d may be communicated with the reference pressure chamber 26e via an orifice formed through the piston for fluid communication therebetween in an substantially restricted amount. The piston 26c is connected to the associated one of suspension member 24 via a piston rod 26b. A suspension coil spring 36 employed in the shown type of the suspension system is not required a resilient force in a magnitude required in the ordinary suspension system and only required the resilient force necessary for maintaining the vehicular body about the suspension member.

The working chamber 26d of the hydraulic cylinder 26 is connected one of pressure control valves 28FL, 28FR, 28RL and 28RR via a pressure control line 38. The pressure control valve 28FL, 28FR, 28RL and 28RR will be hereafter represented by the reference numeral "28" as generally referred to. The pressure control valve 28 is, in turn, connected to a pressure source unit 16 via a supply line 35 and a drain line 37. A branch circuit is provided for connecting the pressure control line 38 to a pressure accumulator 34 via a flow restricting means, such as an orifice 32. Another pressure accumulator 18 is provided in the supply line 35 for accumulating the excessive pressure generated in the pressure source unit 16.

The pressure control valves 28 comprise, though it is not clearly shown in FIG. 1, electrically or electromagnetically operable actuators (reference is made to FIG. 2), such as a proportioning solenoids. The actuators are connected to a microprocessor based control unit 22. The control unit 22 is connected a plurality of vehicular height sensors 21 which are disposed in respectively associated suspension mechanism and designed for monitoring relative position of the vehicular body 10 and the relevant suspension member 24 to produce a vehicular height level indicative signals $h_1$, $h_2$, $h_3$ and $h_4$. The control unit 22 is also connected to a lateral acceleration sensor 23, a longitudinal acceleration sensor 25 and so forth to receive the vehicle driving condition indicative parameters. Based on these control parameters, including the height level indicative signals, a lateral acceleration indicative signal $G_y$ generated by the lateral acceleration sensor, a longitudinal acceleration indicative signal $G_x$ generated by the longitudinal acceleration sensor, and so forth, the control unit performs anti-rolling, anti-pitching and bouncing suppressive suspension controls.

While the specific sensors, such as the vehicle height sensors which comprise strike sensor, the lateral acceleration sensor 23 and the longitudinal acceleration sensor 25, it is possible to replace or add any other sensors which monitors vehicle driving parameter associated with the suspension control. For instance, the stroke sensors employed in the shown embodiment can be replaced with one or more vertical acceleration sensors. Similarly, the lateral acceleration sensor may be replaced with a steering angle sensor for monitoring steering behaviour for assuming lateral force to be exerted on the vehicular body. In the later case, the parameter indicative of the steering angular displacement may be used in combination of a vehicular speed data since vehicular speed may influence for rolling magnitude of the vehicle during steering operation.

Figure 2:
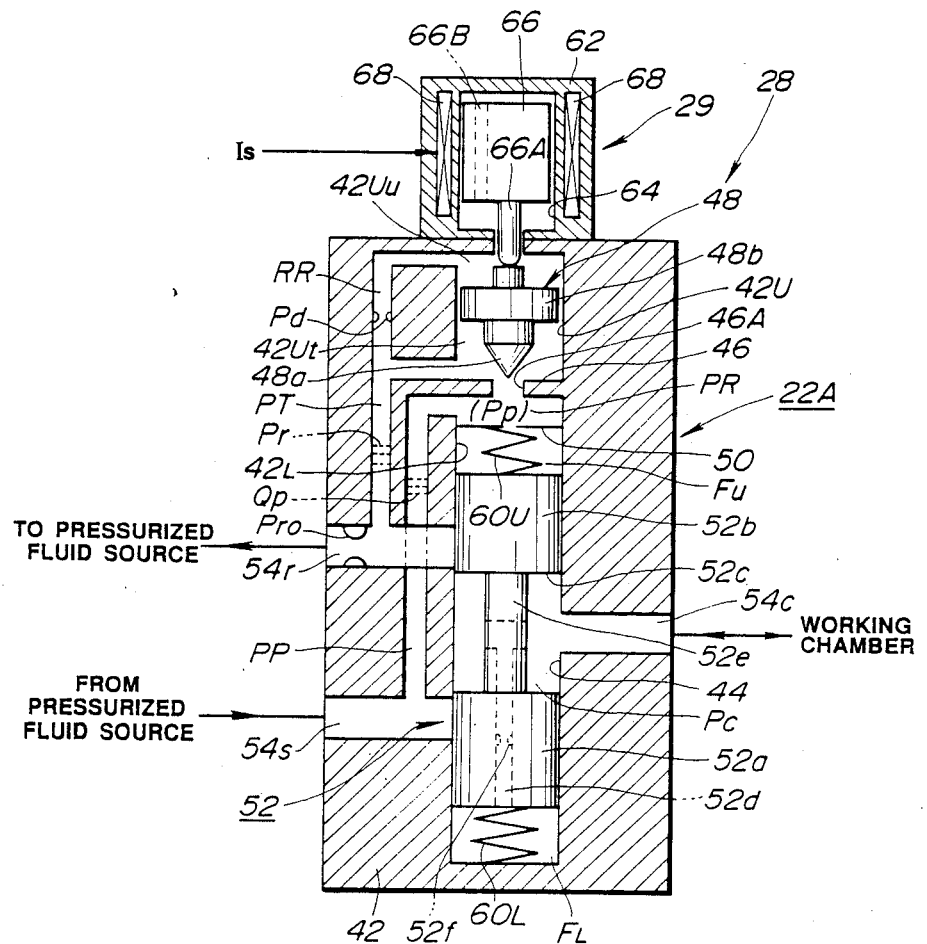
FIG. 2 is a sectional view of the preferred embodiment of the pressure control valve according to the present invention.

As shown in FIG. 2 in detail, the pressure control valve 28 comprises a proportioning valve assembly and is designed to be controlled by an electric current as a control signal supplied from the control unit 22 for varying valve position according to variation of the current value of the control signal. Generally, the pressure control valve 28 controls magnitude of introduction and draining of pressurized fluid into and from the working chamber 26d for adjusting the pressure in the working chamber. As will be appreciated, since the adjusted fluid pressure in the working fluid determines damping force to be created in response to relative displacement between the vehicle body 10 and the suspension member 24. Mode of the suspension mechanism is varied according to variation of the fluid pressure in the working chamber between a predetermined hardest mode to most soft mode.

In the construction of the pressure control valve shown in FIG. 2, the pressure control valve 28 includes a valve housing 42. The valve housing 42 defines a valve bore 44 which is separated in to a valve chamber 42L and a control chamber 42U by means of a partitioning wall 46. The partitioning wall 46 is formed with a communication path opening 46A for communication between the control chamber 42U and the valve chamber 42L. As seen from FIG. 2, the control chamber 42U and the valve chamber 42L are arranged in alignment to each other across the communication path opening 46A. In parallel to a section of the partitioning wall 46 extending perpendicular to the axis of the valve chamber 42L and the control chamber 42U, a fixed orifice defining partitioning member 50 is provided. The partitioning member 50 defines a throttling orifice which is oriented substantially in alignment with the communication path opening 46A. The partitioning wall 46 and the partitioning member 50 are cooperative for defining a pilot chamber PR therebetween.

A valve spool 52 is thrustingly and slidingly disposed within the valve chamber 42L. The valve spool 52 defines an upper feedback chamber FU between the tip end thereof and the partitioning member 50. The valve spool 52 also defines a lower feedback chamber FL between the other tip end thereof and the bottom of the valve chamber 42L. Offset springs 60U and 60L are disposed within the upper and lower feedback chambers FU and FL, which offset springs exerts spring force to the valve spool 52 for resiliently restricting movement of the latter. Resilient force of the offset springs 60U and 60L are so set as to balance to place the valve spool 52 at a neutral position, when the fluid pressure in the upper and flow feedback chambers FU and FL balances to each other. The valve chamber 42L is communicated with a supply line 35 via an supply port 54s, a drain line 37 via a drain port 54r and a pressure control line 38 via a control port 54c, which supply port, drain port and control port are defined in the valve housing 42. The valve spool 52 at the aforementioned neutral position, blocks fluid communication of the pressure control chamber PC with any of the supply port 54s and the drain port 54r. As a result, as long as the valve spool 52 is maintained at the neutral position, overall fluid force in the hydraulic circuit downstream of the pressure control valve, which circuit includes the working chamber 26d of the hydraulic cylinder 26 is held constant.

The valve spool 52 is formed with lands 52a and 52b connected to each other via smaller diameter bar-like section 52c. The land 52a is oriented adjacent the lower feedback chamber FL so as to subject the tip end to the fluid pressure in the lower feedback chamber. Similarly, the land 52b is oriented adjacent the upper feedback chamber FU so as to subject the tip end to the fluid pressure in the upper feedback chamber. The bar-like section 52e between the lands 52a and 52b is cooperative with the peripheral wall of the valve chamber 42L in order to define therebetween a pressure control chamber PC. A fluid flow path 52d is formed through the valve spool 52. The fluid flow path 52d has one end communicated with the pressure control chamber PC and the other end communicated with the lower feedback chamber FL. A fixed flow restricting orifice 52f is formed in the fluid flow path 52d for restricting fluid flow therethrough.

A poppet valve member 48 is disposed within the control chamber 42U for thrusting movement therein. The poppet valve member 48 has a valve head 48a of an essentially conical configuration. The valve head 48a opposes to the communication path opening 46A of the partitioning wall 46. The poppet valve member 48 is operably associated with a proportioning solenoid assembly 29 as the actuator. The proportioning solenoid assembly 29 comprises a housing 62 rigidly secured on the valve housing 42 and defing an internal space to receive therein a plunger 66. The plunger 66 has a plunger rod 66A. The tip end of the plunger rod 66A is kept in contact with the tip end of the poppet valve member 48 remote from the valve head 48a. Therefore, the poppet valve member 48 is axially driven by means of the plunger 66 to control the path area in the communication path opening 46A according to the position of the tip end of the plunger rod 66A. Adjusting of the path area in the communication path opening 46A results in variation of fluid pressure to be introduced into the pilot chamber PR.

In order to control the position of the plunger 66 with the plunger rod 66A, a proportioning solenoid coil 68 is housed within the housing 62 and surrounds the plunger 66. The interior space of the housing 62 is connected to the control chamber 42U for fluid communication therebetween. The plunger 66 is formed with a fluid path 66B for fluid communication between upper and lower sections of the interior space. Therefore, the fluid pressure in the upper and lower sections of the interior space of the housing 62 is held equal to the pressure in the control chamber 42U. This cancels fluid pressure to be exerted on the poppet valve and the plunger so that the position of the tip end of the plunger rod 66A can be determined solely depending upon the magnitude of energization of the proportioning solenoid coil 68.

As seen from FIG. 2, the poppet valve member 48 has a cylindrical larger diameter section 48b for separating the control chamber 42U into upper section and lower section 42Uu and 42Ul. The upper and lower sections 42Uu and 42Ul are communicated with the drain port 54r via a pilot return path PT. A multi-stage orifice Pr is provided in the pilot return path PT for restricting fluid flow therethrough. The multi-stage orifice Pr comprises a plurality of strips formed with through openings and is so designed that one of the orifice oriented at most upstream side is mainly effective for restricting fluid flow when fluid flowing therethrough is steady flow and that all of the orifices of respective strips are equally effective for restricting fluid flow when fluid flow therethrough is disturbed and not steady. Therefore, as will be appreciated herefrom, the multi-stage orifice Pr employed in the shown embodiment serves to provide greater fluid flow restriction against non-steady or disturbed fluid flow than that for the steady flow. As seen from FIG. 2, the multi-stage orifice Pr is provided upstream of the upper and lower sections 42Uu and 42Ul. On the other hand, a fixed throttling orifice Pd is provided at an orientation downstream of the lower section 42Ul and upstream of the upper section 42Uu. Similarly, the pilot chamber PR is communicated with the supply port 54s via a pilot path PP. A multi-stage orifice Qp which has similar construction and flow restricting function to that of the multi-stage orifice Pr is provided in the pilot path PP.

A fixed throttle orifice Pro is also provided in the drain port 54r for restricting fluid flow therethrough. The diameter of the fluid path at the orifice Pro is so selected as to create great flow restriction against pulsatile fluid flow cyclically varying the fluid pressure at a frequency approximately 1 Hz.

As can be seen from FIG. 2, the pressure control valve 28 is so arranged as to direct the axis of the valve bore 44 parallel to the longitudinal axis of the vehicle body. The longitudinal acceleration to be exerted on the vehicular body is much smaller than the lateral acceleration and vertical acceleration exerted on the vehicle body. Therefore, by arranging the pressure control valve 28 so that the poppet valve 48 and the valve spool 52 thrustingly move in longitudinal direction, influence of the externally applied acceleration can be minimized.

Figure 3:
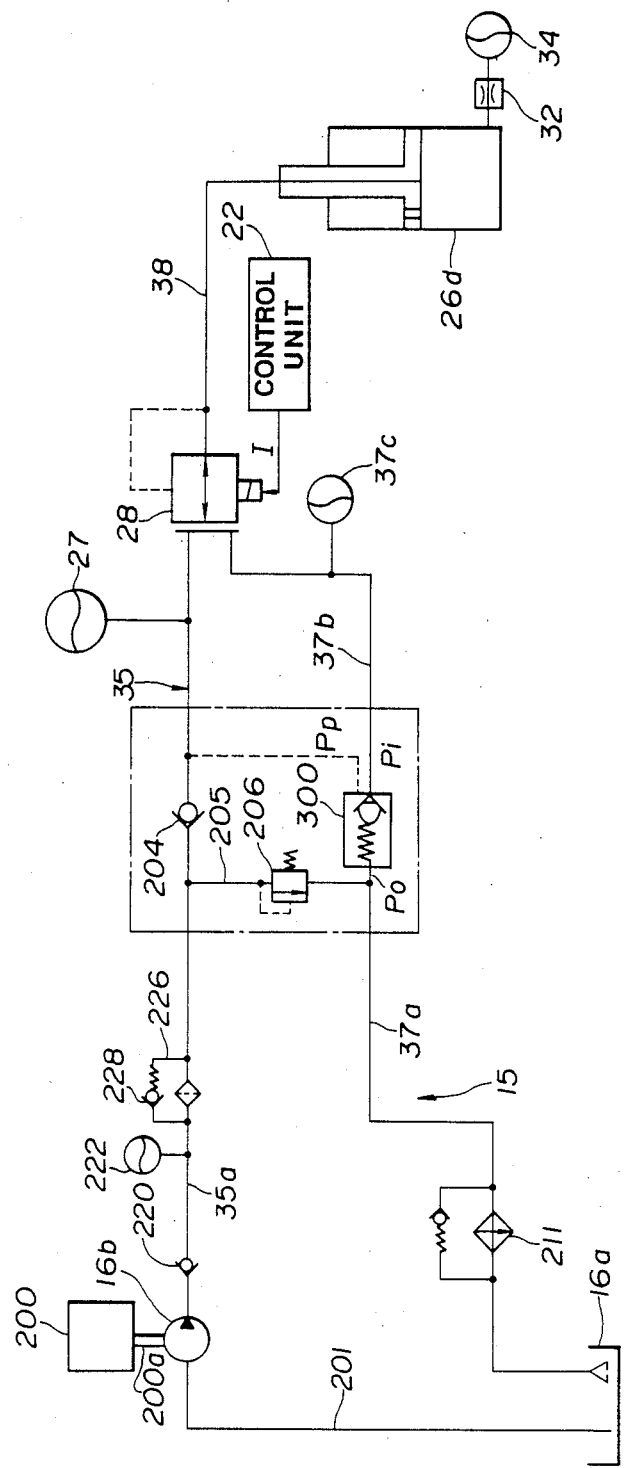
FIG. 3 is a circuit diagram of one example of hydraulic circiut which is applicable for the active suspension system according to the present invention.

FIG. 3 shows detailed circuit construction of one example of hydraulic circuit which is applicable for the shown embodiment of the active suspension system, according to the present invention. The hydraulic circuit includes a fluid pressure source circuit 15 which includes the pressure source unit 16. The pressure source unit 16 includes the pressure unit 16b which comprises a fluid pump, and is connected to a fluid reservoir 16a via a suction pipe 201. The fluid pump 16b is associated with an automotive engine 200 so as to be driven by the output torque of the latter output from an engine output shaft 200a. The outlet of the pressure unit 16b, through which the pressurized working fluid is discharged, is connected to the supply port 54s of the pressure control valve 28 via the supply line 35. An one-way check valve 220, a pressure accumulator 222 for absorbing pulsatile, a filter 224 are disposed in a portion 35a of the supply line 35. A by-pass passage 226 with an one-way check valve 228 is provided for by-passing the filter 224.

A pressure accumulators 27 are also connected to the supply line 35 to receive therefrom the pressurized fluid for accumulating the pressure. An one-way check valve 204 is disposed in the supply line 35 at the position upstream of the junction between the pressure accumulators 27 and the supply line 35.

A pressure relief line 205 is also connected to the supply line 35 at the position intermediate between the filter 224 and the one-way check valve 204, at one end. The other end of the pressure relief line 205 is connected to the drain line 37. A pressure relief valve 206 is disposed in the pressure relief line 205. The pressure relief valve 206 is responsive to the fluid pressure in the supply line 35 higher than a set pressure to drain the excessive pressure to the drain line for maintaining the pressure in the supply line 35 below the given first line pressure level.

On the other hand, an operational one-way check valve 300 is disposed between the sections 37a and 37b of the drain line 37. The operational one-way check valve 300 is also connected to the supply line 35 at downstream of the one-way check valve 204 to receive therefrom the pressure in the supply line as a pilot pressure, via a pilot line 208. The operational one-way check valve 300 is designed to be maintained at open position as long as pilot pressure introduced from the supply line 35 at the orientation downstream of the one-way check valve 204 is held higher than a predetermined pressure. At the open position, the operational one-way check valve maintains fluid communication between the inlet side and outlet side thereof so that the working fluid in the drain line 37 may flow therethrough to the reservoir tank 16a. On the other hand, the operational one-way check valve 300 is responsive to the working fluid pressure in the supply line downstream of the one-way check valve 204 serving as the pilot pressure dropping below the predetermined pressure level to be switched into shut-off position. At the shut-off position, the operational one-way check valve 300 blocks fluid communication between the drain port 54r of the pressure control valve 28 and the reservoir tank 16a. In the shown embodiment, the predetermined pressure is set at a pressure corresponding to the neutral pressure of the pressure control valve unit 28.

For the section 37b of the drain line 37, a pressure accumulator 37c is provided. The pressure accumulator 37c is arranged for absorbing back pressure to be generated by flow resistance in the drain line 37.

An oil cooler 211 is disposed in the drain line 37 for cooling the working fluid returning to the reservoir tank 16a.

Figure 5:
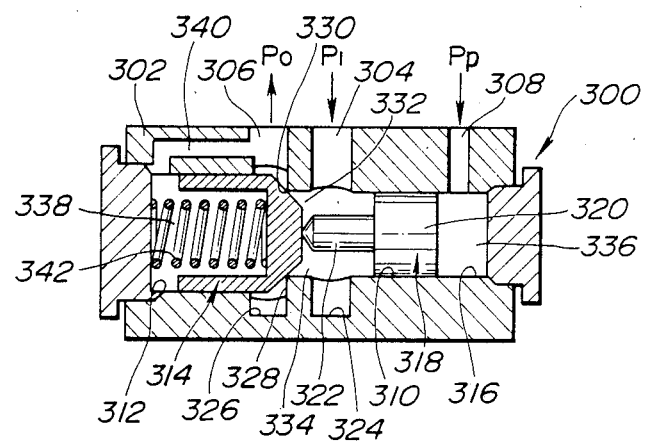
FIG. 5 is a sectional view of an operational one-way check valve employed in the preferred embodiment of the hydraulic circuit of the active suspension system of the invention.
Figure 6:
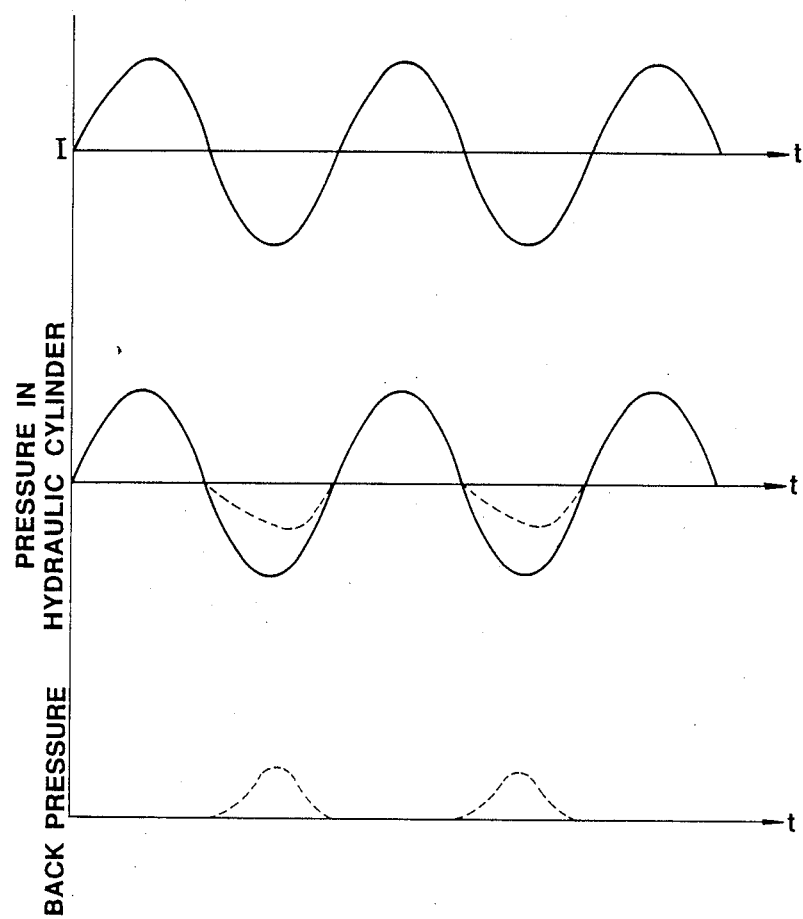
FIG. 6 is a chart showing influence of back pressure in a drain line for variation of fluid pressure in a working chamber of a hydraulic cylinder in the preferred embodiment of the active suspension system.

FIG. 5 shows the detailed construction of the preferred embodiment of the operational one-way check valve 300 to be employed in the preferred embodiment of the active suspension system according to the present invention. As shown in FIG. 5, the operational one-way check valve 300 comprises a valve housing 302 formed with an inlet port 304, an outlet port 306 and a pilot port 308. The valve housing 302 defines a valve bore 310. The valve bore 310 comprises a larger diameter section 312, in which a poppet valve 314 is thrustingly disposed, and a smaller diameter section 316, in which a valve spool 318 is disposed. The pilot port 308 is communicated with the supply line 35 at the section 35a disposed between the one-way check valve 204 and the pressure control valve unit 28FL 28FR, 28RL and 28RR, via the pilot line 300a. The pilot port 308 is, on the other hand, communicated with the smaller diameter section 316 to supply the line pressure of the supply line 35 at the orientation downstream of the one-way check valve 204 as the pilot pressure Pp. On the other hand, the inlet port 304 is communicated with the drain port 54r of the pressure control valve unit 28 via a section 37b of the drain line 37. The inlet port 304 communicates with the smaller diameter section 316 via an annular groove 324 formed on the inner periphery of the valve housing 302. The outlet port 306 is communicated with the fluid reservoir 16a via a section 37a of the drain line 37 and, in turn, communicated with the larger diameter section 312 via an annular groove 326 formed on the inner periphery of the valve housing 302. As seen from FIG. 5, the annular grooves 324 and 326 are oriented in side-by-side relationship with leaving a radially and inwardly projecting land 328. The land 328 has a shoulder 330.

The valve spool 318 and the poppet valve 314 are cooperated with each other to define therebetween a control chamber 334 which communicates with the inlet port 304 and the outlet port 306. On the other hand, the valve spool 318 also defines a pilot chamber 336 at a side remote from the control chamber 334. The poppet valve 314 defines a pressure setting chamber 338 at a side remote from the control chamber 334. The pressure setting chamber 338 is communicated with the outlet port 306 via a path 340. A set spring 342 is disposed within the pressure setting chamber 338 for normally exerting a spring force to the poppet valve 314. In the preferred embodiment, the set spring 342 is provided a set force which corresponds the neutral pressure $P_N$ of the pressure control valve unit 28.

The valve spool 318 has a valve body 320 and a valve stem 322 projecting from the valve body toward the poppet valve 314. The tip end of the valve stem 322 contacts with the mating surface of the poppet valve 314. The poppet valve 314 has an annular shoulder 332 mating with the shoulder of the land 330.

With the construction set forth above, the operational one-way check valve 300 operates as both of the pressure relief valve for relieving the excessive pressure in the drain line and one-way check valve. The relief pressure of the poppet valve 314 can be illustrated by the following balancing equation:

$$F_0 = P_{p0} \times A$$

where $F_0$ is the set pressure of the set spring 342;

A is an effective area of the spool; and $P_{p0}$ is a relief pressure.

Here, assuming that the pressure Pi at the inlet port 304 is greater than or equal to the pilot pressure $P_p$ at the pilot chamber 336, the valve spool 318 is shifted away from the poppet valve 314 so that the pilot pressure $P_p$ in the pilot chamber 336 is not active on the valve position of the poppet valve. In such case, the poppet valve 314 operates purely as the pressure relief valve for relieving excessive pressure. At this time, the force balance as illustrated by:

$$Pi \times A = P_{p0} \times A$$

can be established/ Therefore, as long as the fluid pressure at the inlet port 304 is higher than the relief pressure $P_{p0}$, the shoulder 332 of the poppet valve 314 is held away from the shoulder 330 of the land 328 so as to permit fluid flow through the outlet port 306 and the section 37a of the drain line 37 to the fluid reservoir 16a. On the other hand, when the pressure at the inlet port 304 is lower than or equal to the relief pressure $P_{p0}$, then, the spring force of the set spring 342 overcomes the fluid pressure to establish contact between the mating shoulders 332 and 330 to block fluid communication between the control chamber 334 and the outlet port 306.

On the other hand, when the pressure Pi at the inlet port 304 is lower than the pilot pressure $P_p$ in the pilot chamber 336, the valve spool 318 is shifted toward the poppet valve 314 to contact with the latter at the tip end of the valve stem 334. At this time, the force to depress the valve stem 334 onto the poppet valve 314 can be illustrated by $(P_p - Pi) \times A$. At this time, the pressure Pi introduced into the control chamber 334 via the inlet port 304 is canceled as an internal pressure. Therefore, the pressure balance at the poppet valve 314 can be illustrated by:

$$F_0 + kx = P_p \times A$$

where k is a spring coefficient of the set spring 342; and x is a stroke of the poppet valve 314.

From the balancing equations give hereabove, the operational check valve 300 becomes open when the pilot pressure $P_p$ is higher than the relief pressure $P_{p0}$ and is held at shut-off position while the pilot pressure is held lower than the relief pressure.

In the hydraulic circuit set forth above, the fluid is pump 16 is driven by the engine 200 to discharge pressurized working fluid while the engine is running. The pressurized fluid discharged from the outlet of the fluid pump 16 is fed to the pressure control valve 28 via the supply line 35 including the pressure regulating orifice 202 and the one-way check valve 204. When the pressure control valve 28 is shifted to establish fluid communication between the supply port 54s and the pressure control port 54c from the valve position shown in FIG. 2, the pressurized working fluid passes the pressure control valve 28 and introduced into the working chamber 26d of the hydraulic cylinder 26. On the other hand, when the pressure control valve 28 is shifted to block fluid communication between the supply port 54s and the pressure control chamber PC, the fluid pressure in the supply line 35 increases. When the line pressure in the supply line 35 becomes higher than or equal to the set pressure of the pressure relief valve 206 in the pressure relief line 205, the excessive pressure is fed to the drain line 37 via the pressure relief valve 206 and thus returned to the reservoir tank 16a.

The fluid pressure in the supply line 35 is also fed to the operational one-way check valve 300 via a pilot line 208. As set forth, the operational one-way check valve 300 is placed at open position as long as the pilot pressure introduced through the pilot line 300a is held higher than or equal to the set pressure thereof. Therefore, fluid communication between the pressure control valve 28 and the reservoir tank 16a is maintained. At this position, the working fluid is thus returned to the reservoir tank 16a via the drain line 37 via the operational one-way check valve 300 and the oil cooler 211.

The operational one-way check valve 300, even at the open position, serves as a resistance to the fluid flow. Therefore, the fluid pressure in the drain line 37 upstream of the operational one-way check valve 300 becomes higher, i.e. higher than the offset pressure $P_0$. Then, the pressure relief valve 209 becomes active to open for allowing the excessive pressure of the working fluid to flow through the by-pass line 210.

When the engine stops, the pressure unit 16 ceases operation. By stopping the pressure unit 16, the working fluid pressure in the supply line 35 drops. According to drop of the pressure in the supply line 35, the pilot pressure to be exerted to the opertional one-way check valve 300 via the pilot line 300a drops. When the pressure in the pilot line 300a drops below or equal to the set pressure, the operational one-way check valve 300 is switched into operational one-way check position to block fluid communication therethrough. As a results, the fluid pressure in the drain line 37 upstream of the operational one-way check valve 300 becomes equal to the pressure in the working chamber 26d. Therefore, even when the working fluid leaks through a gap between the spool valve 52 and the inner periphery of the valve bore, it is not affect the fluid pressure in the working chamber.

Figure 4:
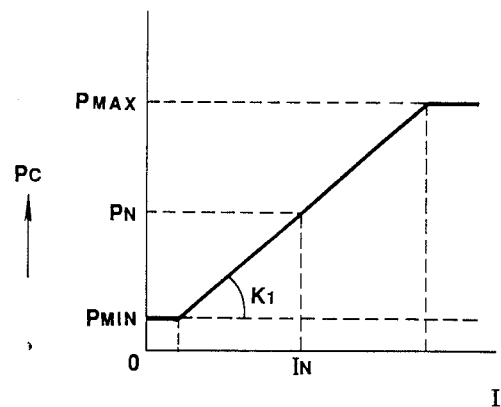
FIG. 4 is a chart showing relationship between an electric current value of a control signal to be supplied for an actuator of the pressure control valve and a working fluid pressure supplied to a working chamber of a hydraulic cylinder.

FIG. 4 shows variation of the working fluid pressure in the working chamber 26d of the hydraulic cylinder 26 according to variation of the current value of the control signal applied to the actuator 29 of the pressure control valve 28. As seen from FIG. 4, the hydraulic pressure in the working chamber 26d varies between a maximum pressure $P_{max}$ which is saturation pressure of the pressure source unit 16 and a minimum pressure $P_{min}$ which is set at a magnitude in view of a noise component to be contained in the control signal. As seen from FIG. 4, the maximum pressure $P_{max}$ corresponds to the maximum current value $I_{max}$ of the control signal and the minimum pressure $P_{min}$ corresponds to the minimum current value $I_{min}$ of the control signal. Furthermore, the hydraulic pressure level as labeled $P_N$ represents neutral pressure at the neutral current $I_N$. As seen, the neutral current $I_N$ is set at an intermediate value between the maximum and minimum current values $I_{max}$ and $I_{min}$.

Operation of the aforementioned pressure control valve 28 in terms of control of suspension characteristics and absorption of road shock will be discussed herebelow.

In general, the pressurized working fluid source unit 16 supplies the predetermined line pressure. For example, the line pressure in the supply line 35 may be set at a pressure of 80 kgf/cm$^2$.

When the vehicle steadily travels on a smooth straight road, the current value of the control signal to be applied to the actuator 29 of the pressure control valve 28 is maintained at the neutral value $I_N$. As long as the neutral value $I_N$ of the control signal is applied to the actuator 29, the proportioning solenoid coil 68 is energized at a magnitude corresponding the neutral value $I_N$ of the control signal to place the poppet valve 48 at the corresponding position. At this position, the flow resistance at the communication path opening 46A, path area of which is restricted by the valve head 48a of the poppet valve 48 becomes the neutral value. At this position of the poppet valve 48, the pilot pressure $P_p$ within the pilot chamber PR is maintained at the neutral pressure $P_N$. At this condition, if the fluid pressures is the control pressure Pc in the pressure control port 54c is held equal to the fluid pressure in the working chamber 26d of the hydraulic cylinder 26, the fluid pressure in the upper and lower feedback chambers FU and FL are held in balance to each other. The valve spool 52 is maintained at the neutral position to shut fluid communication between the supply port 54s, the drain port 54r and the pressure control port 54c. Therefore, the control pressure Pc is maintained at the neutral pressure $P_N$.

At this condition, when relatively high frequency and small magnitude road shock input through the vehicular wheel, is absorbed by fluid communication between the working chamber 26d and the pressure accumulator 34 via the orifice 32. The flow restriction in the orifice 32 serves to absorb the bounding and rebounding energy. Therefore, high frequency and small magnitude road shock can be effectively absorbed so as not to be transmitted to the vehicle body.

When the piston 26c strokes in rebounding direction compressing the working chamber 26d, the fluid pressure in the working chamber increases to increase the control pressure Pc in the pressure control port 54c. Therefore, the control pressure Pc becomes higher than the pilot pressure $P_p$ in the pilot chamber PR. This results in increasing of the fluid pressure in the lower feedback chamber FL at a magnitude higher than that in the upper feedback chamber FU. This causes upward movement of the valve spool 52 to establish fluid communication between the drain port 54r and the pressure control port 54c. Therefore, the pressure in the pressure control port 54c is drained through the drain line 37. This causes pressure drop at the pressure control port 54c so that the control pressure Pc becomes lower than the pilot pressure $P_p$ in the pilot chamber PR. Then, the fluid pressure in the upper feedback chamber FU becomes higher than that in the lower feedback chamber FL. Therefore, the valve spool 52 is shifted downwardly to establish fluid communication between the supply port 54s and the pressure control port 54c. The pressurized working fluid in the supply line 35 is thus supplied to the working chamber 26d via the pressure control port 54c to increase the fluid pressure. By repeating the foregoing cycles, pressure balance is established between the pressure control port 54c and the pilot chamber PR. Therefore, the control pressure Pc as well as the fluid pressure in the working chamber 26d are adjusted to the pilot pressure.

During the pressure adjusting operation set forth above, the fixed throttling orifice Pro serves for restricting fluid flow from the pressure control port 54c to the drain line 37. This flow restriction at the orifice Pro serves as resistance against the rebounding stroke of the piston 26c to damp or absorb energy causing rebounding motion of the vehicle body. Furthermore, as set out, working fluid in the pilot chamber PR is generally introduced through the pilot path PP via the multi-stage orifice Qp and return through the pilot return path PT via the lower section 42U1 of the control chamber 42U and via the multi-stage orifice Pr. As long as the fluid flow in the pilot return path PT is not disturbed and thus steady. The most upstream side orifice Pr' is mainly effective for restricting the fluid flow. Therefore, magnitude of flow restriction is relatively small so as to provide sufficient response characteristics in reduction of the pilot pressure. On the other hand, when the working fluid flowing from the control chamber 42U confluence with the working fluid from the pilot chamber PR, back pressure is produced in the drain port 54r, the fluid flowing through the pilot return path PT is disturbed and thus becomes unstable. This tends to cause serving of the pressurized fluid from the drain port 54r to the pilot chamber PR. In such case, all of the orifices in the multi-stage orifice Pr is effective to create greater flow restriction that than for the steady flow. This avoid influence of the back pressure created in the drain port 54r.

Similarly, in response to the bounding stroke of the piston 26c, the valve spool 52 is shifted up and down to absorb bounding energy and maintains the fluid pressure in the working chamber 26d of the hydraulic cylinder 26 at the neutral pressure.

On the other hand, when the anti-rolling suspension control is taken place in response to the lateral acceleration exerted on the vehicle body, the control signal current value is derived on the basis of the magnitude of the lateral acceleration monitored by the lateral acceleration sensor 23. Generally, in order to suppress rolling motion of the vehicular body, the fluid pressure in the working chamber 26d of the hydraulic cylinder 26 which is provided for the suspension mechanism at the side where the vehicular height is lowered across the neutral position, is increased to suppress lowering motion of the vehicle body. On the other hand, the fluid pressure in the working chamber 26d of the hydraulic cylinder 20 which is provided for the suspension mechanism at the side where the vehicular height is risen across the neutral position, is decreased to suppress rising motion of the vehicle body. Therefore, in order to control the pressures in the working chambers 26d of the both side hydraulic cylinders 26, control signal current values are increased and creased across the neutral value $I_N$.

For example, when rolling motion is caused by left turn of the vehicle, control current for the actuators 29 of the pressure control valves 28 controlling the fluid pressures in the front-right and rear-right hydraulic cylinders 26FR and 26RR are to be increased to be greater than the neutral current $I_N$, and the control current for the actuator of the pressure control valves 28 controlling the fluid pressures in the front-left and rear-left hydraulic cylinders 26FL and 26RL are to be decreased to be smaller than the neutral current $I_N$. By the control current supplied to respective actuators 29, the proportioning solenoid coils 68 are energized at the magnitudes corresponding to the control signal currents to place the poppet valves 48 at respective corresponding positions. By variation of the positions of the poppet valves 48, flow restriction magnitude at respective communication path openings 46A is varied to vary the pilot pressures Pp in the pilot chamber PR. As set forth, since the fluid pressures in the working chambers 26d become equal to the pilot pressures Pp, the suspension characteristics at respective hydraulic cylinders 26 can be adjusted.

Anti-pitching, bouncing suppressive suspension control can be performed substantially in the same manner to that discussed with respect to the anti-rolling control.

Figure 7:
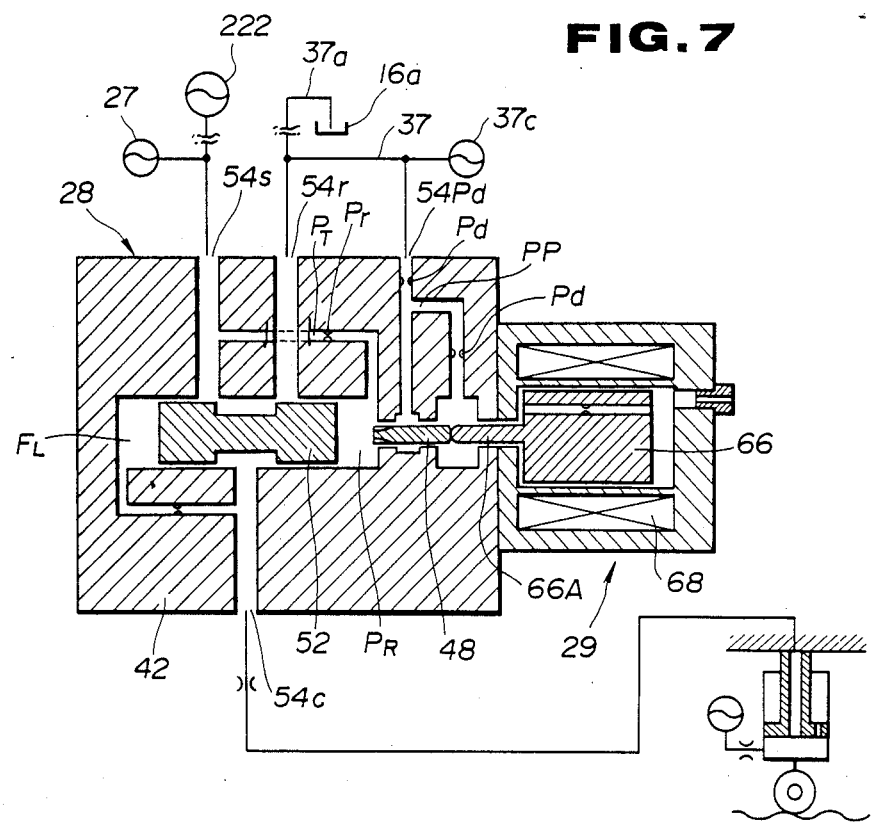
FIG. 7 is a section of a modified embodiment of the pressure control valve unit to be employed in the preferred embodiment of the active suspension system of FIG. 1.

FIG. 7 shows a modification of the pressure control valve unit 28 employed in the active suspension system according to the present invention. In this modification, the pilot path PP is connected to a path connecting the pressure accumulator 37c to the drain line 37 via a pilot drain port 54pd which has a flow restriction orifice Ppd. With this construction, substantially the same back pressure absorption can be obtained.

Figure 8:
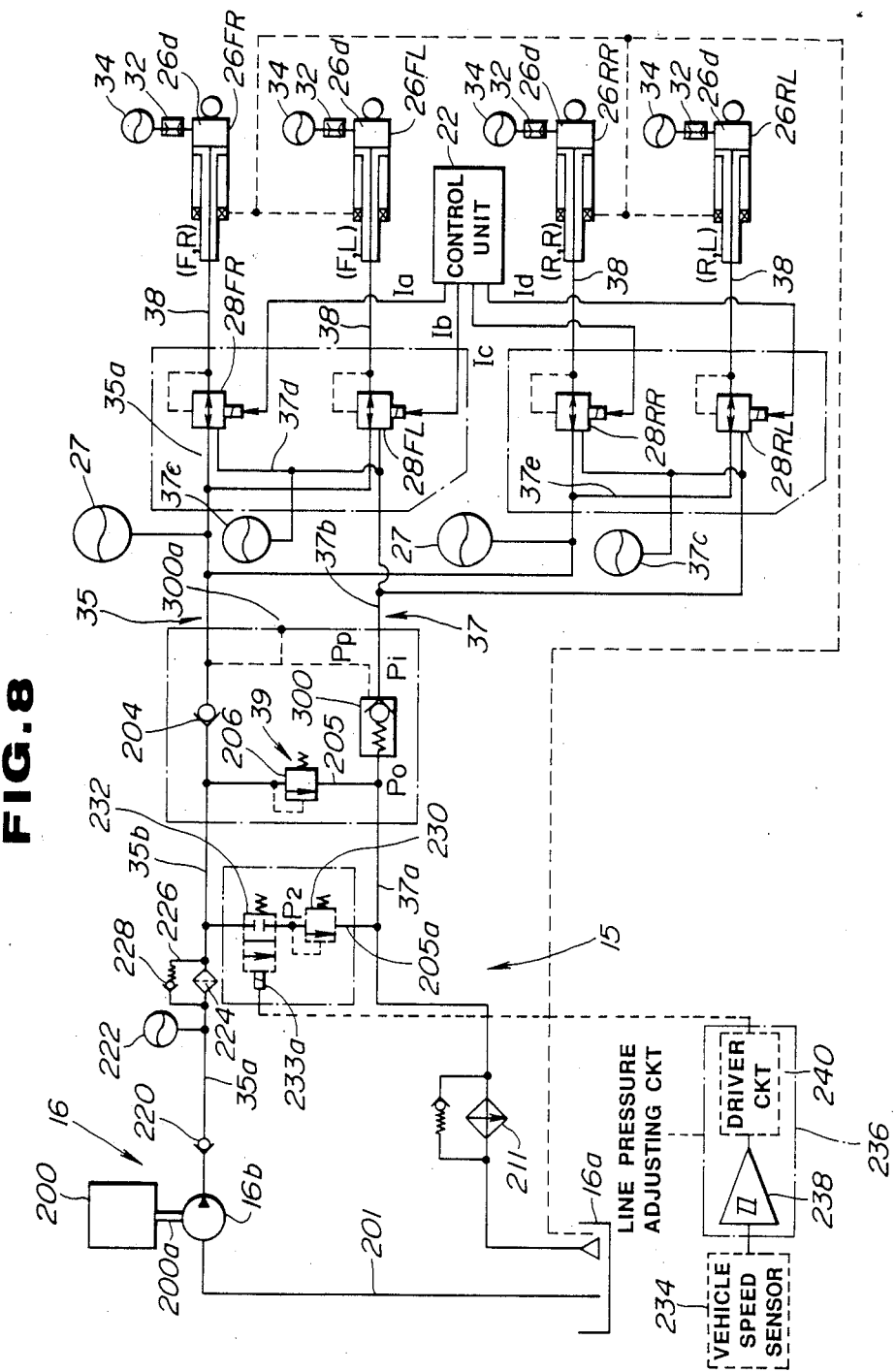
FIG. 8 is a circuit diagram of a modified hydraulic circuit in the active suspension system.

FIG. 8 shows a modification of the hydraulic circuit which is also applicable for the shown embodiment of the active suspension system, according to the present invention. Similarly to the foregoing circuit in FIG. 3, the hydraulic circuit includes a fluid pressure source circuit 15 which includes the pressure source unit 16. The pressure source unit 16 includes the pressure unit 16b which comprises a fluid pump, and is connected to a fluid reservoir 16a via a suction pipe 201. The fluid pump 16b is associated with an automotive engine 200 so as to be driven by the output torque of the latter output from an engine output shaft 200a. The outlet of the pressure unit 16b, through which the pressurized working fluid is discharged, is connected to the supply ports 54s of the pressure control valves 28FL, 28FR, 28RL and 28RR respectively associated with the hydraulic cylinders 26FL, 26FR, 26RL and 26RR, via the supply line 35. An one-way check valve 220, a pressure accumulator 222 for absorbing pulsatile, a filter 224 are disposed in a portion 35b of the supply line 35. A by-pass passage 226 with an one-way check valve 228 is provided for by-passing the filter 224. The supply line 35 has branch lines 35a respectively connected to the supply ports 54s of respectively corresponding pressure control valves 28FL, 28FR, 28RL and 28RR.

A high pressure accumulators 27 are also connected to the supply line 35 to receive therefrom the pressurized fluid for accumulating the pressure, which accumulator has large capacity and high set pressure, e.g. several tens $kg/cm^2$. An one-way check valve 204 is disposed in the supply line 35 at the position upstream of the junction between the high pressure accumulators 27 and the supply line 35.

A pressure relief line 205 is also connected to the supply line 35 at the position intermediate between the filter 224 and the one-way check valve 204, at one end. The other end of the pressure relief line 205 is connected to the drain line 37. A pressure relief valve 206 is disposed in the pressure relief line 205. The pressure relief valve 206 is responsive to the fluid pressure in the supply line 35 higher than a set pressure to drain the excessive pressure to the drain line for maintaining the pressure in the supply line 35 below the given first line pressure level.

It should be noted if desired, line pressure can be adjusted depending upon preselected vehicle driving parameter such as a vehicle speed. In case, the vehicle speed dependent variable line pressure is desired, another pressure relief valve 230 may be provided in parallel to the pressure relief valve 206 as shown by broken line in FIG. 7. The pressure relief valve 230 is disposed in an additional pressure relief line 205a which extends parallel to the pressure relief line 205 and thus connected to the section 35a of the supply line 35 in the fluid pressure source circuit 15 at the upstream end and to the section 37a of the drain line 37 in the fluid pressure source circuit at the downstream end. An electromagnetic shut-off valve 232 is also provided in the pressure relief line 205a at an orientation upstream of the pressure relief valve 230. The pressure relief valve 205a is provided lower set pressure than that of the pressure relief valve 206 so as to adjust the line pressure in the supply line 35 at a second line pressure level which is lower than the first line pressure level.

The electromagnetic shut-off valve 232 has an electromagnetic solenoid 232a connected to a line pressure adjusting circuit 236 so that it may be operated in response to a line pressure control signal from the latter to switch valve position between an open position to establish fluid communication between the supply line 35 and the pressure relief valve 230 and a closed position to block fluid communication therebetween. The line pressure adjusting circuit 236 comprises a Schumitt trigger circuit 238 and a driver circuit 240. The Schumitt trigger circuit 238 is connected to a vehicle speed sensor 234 which monitors vehicle speed to produce a vehicle traveling speed to produce a vehicle speed indicative signal V. The Schmitt trigger circuit 238 is designed to respond to a vehicle speed indicative signal value greater than a preset speed to output HIGH level signal and output LOW level signal otherwise. The driver circuit 240 is so designed as to output driver current to the solenoid 232a of the electromagnetic shut-off valve 232 for energizing the solenoid to place the shut-off valve at open position when the ouput of the Schmitt trigger circuit 238 is held LOW level. The preset speed of the Schmitt trigger circuit 238 represents substantially low vehicle speed where adjustment of the fluid pressure in the working chamber 26d of the hydraulic cylinder 26 is not required.

Therefore, while the vehicle is not running or is traveling at substantially low speed lower than the set speed, the pressure relief valve 230 becomes active to relief the pressure in excess of the second relief pressure. Therefore, the line pressure in the supply line 35 is lowered to reduce the load on the engine for driving the fluid pump 16a can be reduced.

On the other hand, an operational one-way check valve 300 is disposed between sections 37a and 37b of the drain line 37. The section 37b of the drain line 37 forms two branches. As can be seen from FIG. 7, the drain ports 54r of the pressure control valves 28FL and 28FR are connected to one of the branch of the section 37b via a communication lines 37d. For the communication line 37d, a low pressure accumulator 37c which has smaller capacity than the accumulator 27 and lower set pressure, e.g. several kg/cm$^2$, is connected. On the other hand, the drain ports 54r of the pressure control valves 28RL and 28RR are connected to one of the branch of the section 37b via a communication lines 37e. For the communication line 37e, a low pressure accumulator 37c is connected. The operational one-way check valve 300 is also connected to the supply line 35 at downstream of the one-way check valve 204 to receive therefrom the pressure in the supply line as a pilot pressure, via a pilot line 208. The operational one-way check valve 300 is designed to be maintained at open position as long as pilot pressure introduced from the supply line 35 at the orientation downstream of the one-way check valve 204 is held higher than a predetermined pressure. At the open position, the operational one-way check valve maintains fluid communication between the inlet side and outlet side thereof so that the working fluid in the drain line 37 may flow therethrough to the reservoir tank 16a. On the other hand, the operational one-way check valve 300 is responsive to the working fluid pressure in the supply line downstream of the one-way check valve 204 serving as the pilot pressure dropping below the predetermined pressure level to be switched into shut-off position. At the shut-off position, the operational one-way check valve 300 blocks fluid communication between the drain port 54r of the pressure control valve 28 and the reservoir tank 16a. In the shown embodiment, the predetermined pressure is set at a pressure corresponding to the neutral pressure of the pressure control valve unit 28.

An oil cooler 211 is disposed in the drain line 37 for cooling the working fluid returning to the reservoir tank 16a.

In the shown construction, piping for drain line can be simplified by commonly using the sections 37b. Also, by providing the low pressure accumulator in the communication lines 37d and 37e, back pressure in the drain line can be successfully absorbed. Also, the pressure accumulators 37c are also active for absorbing interfering pressure between two pressure control valves commonly connected to single drain line 37b.

Figure 9:
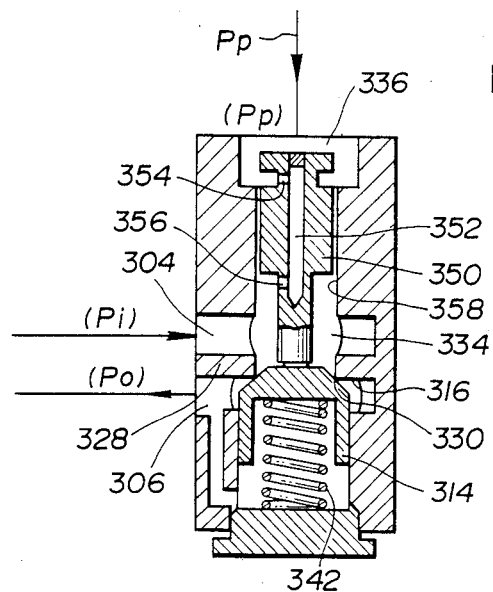
FIGS. 9 and 10 are section showing modifications of the pilot operated operational one-way check valve to be employed in the active suspension system of the invention.
Figure 10:
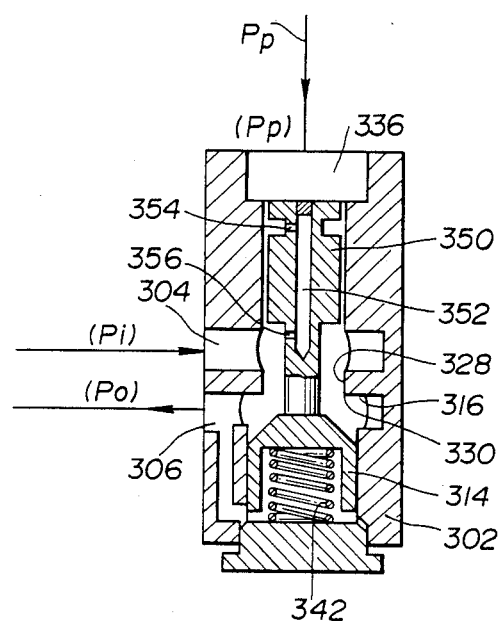

FIGS. 9 and 10 show modifications of the operational one-way check valves 300 applicable for the preferred embodiment of the active suspension system according to the present invention. In the embodiment of FIG. 9, the valve spool 350 is formed of an axially extending bore 352 communicated with the pilot chamber 336 via a radially extending orifice 354 and with the control chamber 334 via a radially extending orifice 356. As can be seen from FIG. 10, when the valve spool 350 is shifted to place the upper end in the drawings into the bore 358, the orifice 354 is blocked from communication with the pilot chamber 336. Therefore, with the shown construction, when the control chamber 334 is in communication with the outlet port 306 by shifting the poppet valve 314 away from the shoulder 330 of the land 328, the fluid communication between the pilot chamber 336 and the control chamber 334 via the axial bore 352 and the orifices 354 and 356 can be blocked. On the other hand, when the poppet valve 314 is seated onto the shoulder 330 for blocking fluid communication between control chamber 334 and the outlet port 306, the fluid communication between the pilot chamber 336 and the control chamber 334 can be established via the axial bore 352 and the orifices 354 and 356.

In the preferred embodiment of the active suspension system, when an ignition switch is turned OFF at a time $t_1$, the engine stops running. Accordingly, the fluid pump 16b is shut down. Therefore, line pressure supplied from the fluid pump 16b becomes zero. At this time, the control unit 22 is maintained in active state for a predetermined period of time T by means of a timer. In the preferred embodiment, the predetermined period T is set at about 90 sec. The control unit 22 then maintain the control signal for respective pressure control valves 28FL, 28FR, 28RL and 28RR for commanding to supply neutral pressure to the control unit 22. Then, the fluid pressure accumulated in the high pressure accumulator 27 is supplied to the pilot chamber PR via the inlet port 54s, the pilot path PP and the drain port 54s to establish the pilot pressure corresponding to the neutral value $I_N$ of the control signal in pilot chamber PR.

Figure 11:
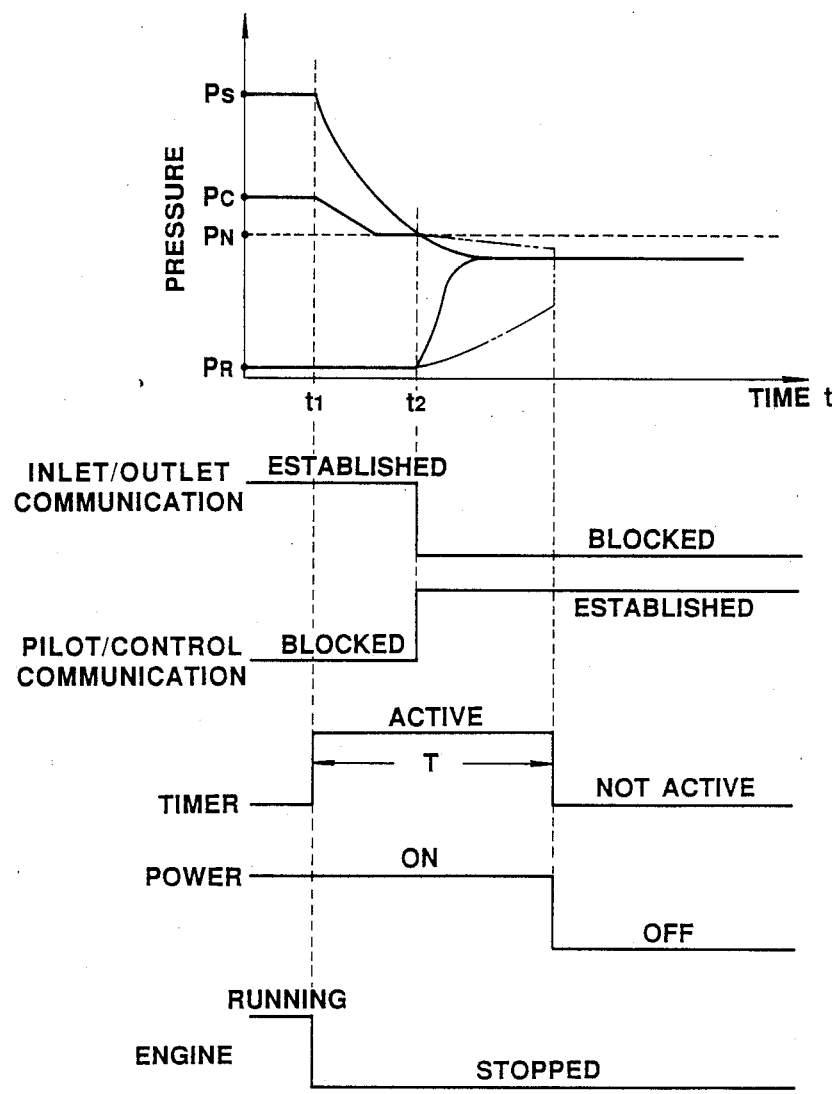
FIG. 11 is a timing chart showing preferred process of operation of the preferred embodiment of the active suspension system in response to OFF-set of power supply.

According to consumption of the accumulated pressure in the high pressure accumulator 27, the supply pressure Ps is gradually lowered as shown in FIG. 11. When the supply pressure Ps drops at a relief pressure Ppl which corresponds to the neutral pressure $P_N$, the poppet valve 314 is shifted to the position of FIG. 9 for blocking fluid communication between the control chamber 334 and the outlet port 306. Simultaneously, since the valve spool 350 is shifted upwardly as shown in FIG. 9 to establish fluid communication between the pilot chamber 336 and the control chamber 334, at a time $t_2$. At this position, since the control signal $I_N$ commanding the neutral pressure $P_N$ for the pressure control valves 28FL, 28FR, 28RL and 28RR is maintained, the pressurized fluid is accumulated in the section 37b of the drain line 37. At this time, the pilot pressure introduced into the pilot chamber 336 of the operational one-way check valve 300 is returned to the section 37b via the bore 352 and orifices 354 and 356. Therefore, the return pressure $P_R$ in the low pressure accumulators 37c is rapidly increased as shown in FIG. 11.

After the predetermined period of time T, the control unit 22 is shut down. Therefore, the control signal value I becomes zero. By this, direct communication between the control port 54c and the drain port 54r is established in each of the pressure control valves 28FL, 28FR, 28RL and 28RR. However, the fluid pressure in the circuit upstream of the operational one-way check valve balances near the neutral pressure $P_N$, the fluid pressure in the working chamber can be maintained at constant value. This clearly enhance characteristics of building up the return pressure in the low pressure accumulator 37o in response to ON set of power supply.

Figure 12:
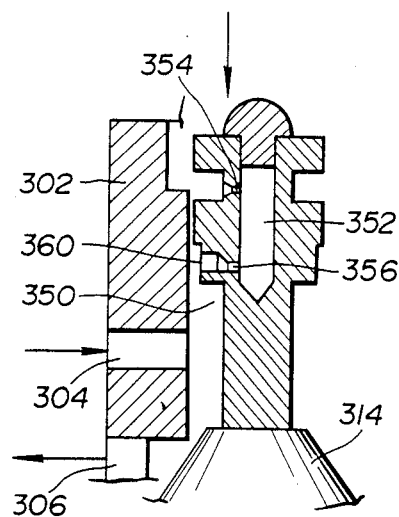
Figure 13:
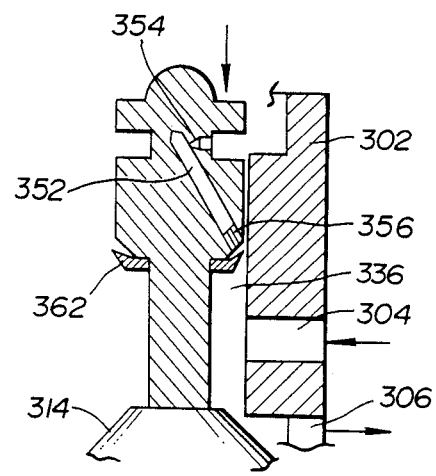
Figure 14:
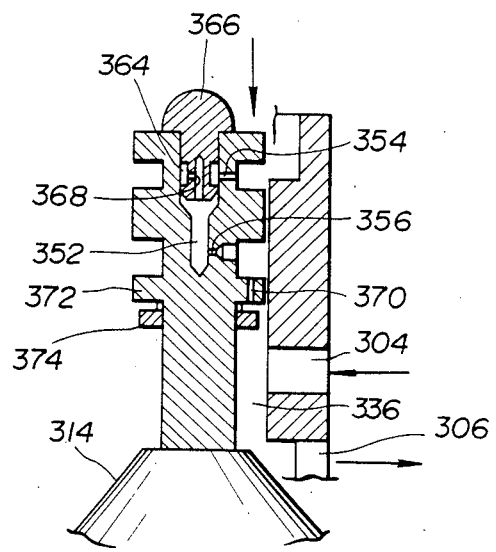

FIGS. 12 through 14 show various configurations of the fluid communication path for establishing fluid communication between the pilot chamber and the control chamber of the operational one-way check valve to be employed in the preferred embodiment of the active suspension system according to the present invention. These variation may also provide substantially the same performance to that of the former embodiment. In the construction of FIG. 12, a recess 360 is formed in addition to the construction of FIGS. 9 and 10. This construction additionally provides noise elimination effect in comparison with that in the former embodiment. In the construction of FIG. 13, the bore 352 is formed in oblique to the axis of the valve spool 350. Opposing to one end opening of the orifice, a skirt portion 362 is formed for bumping the fluid from the pilot chamber. This construction also effective for noise elimination. In the construction of FIG. 14, an annular groove 364 is formed on the outer periphery of a plug member 366 sealingly closing the open end of the bore 352. The annular groove 364 is in communication with the axial bore 352 via a radially extending orifice 368. Further orifice 370 is formed through a skirt portion 372. Furthermore, a skirt section 374 is provided in opposition to the discharge end of the orifice 370. With four stage orifice arrangement in FIG. 14, substantially high noise elimination effect can be obtained.

Figure 15:
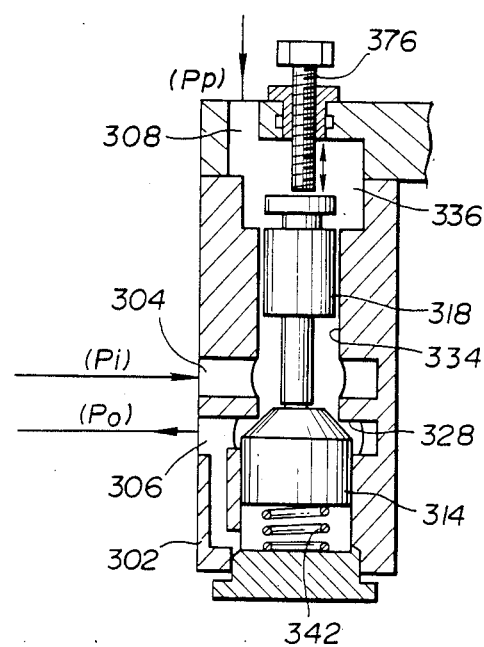
FIGS. 12 through 16 are sections respectively showing modified constructions of the operational one-way check valve to be employed in the active suspension system of the invention.
Figure 16:
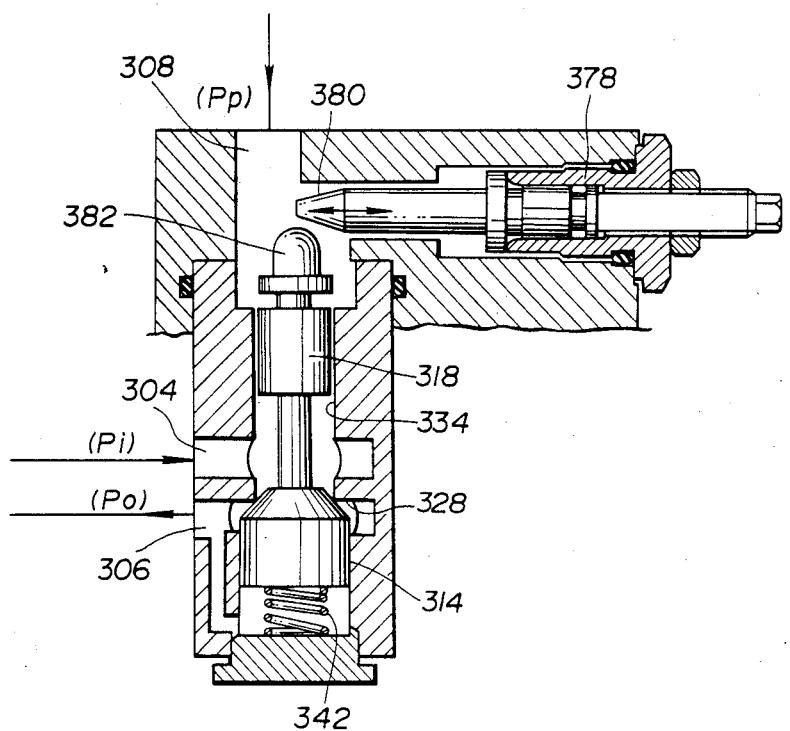

FIG. 15 shows another modification of the operational one-way check valve. The valve construction per se is essentially the same as that of FIG. 5. In addition to this, the shown embodiment, employs a manually operable screw 376 for manually operating the poppet valve 314 via the valve spool 318 so that the fluid communication between the control chamber 334 and the outlet port 306 can be manually established. This mechanism is particularly effective for maintenance purpose. Namely, in order to perform, vacuum drawing or flushing, such function enabling to manually establishing fluid communication between the control chamber and the outlet port can be conveniently used. FIG. 16 shows further modification of the mechanism for manually establishing fluid communication between the control chamber and the outlet port. In the shown construction, the manually operable screw 376 is replaced with a push pin 378 with a tapered head 380. As can be seen from FIG. 16, the push pin 378 is laterally movable with respect to the valve spool 318. The tapered end 380 of the push pin 378 is oriented to mate with a round head 382 of the valve spool 318. With the shown construction, by shifting the push pin 378 toward the valve spool 318, the tapered end 380 comes into contact and gradually shift the valve spool downwardly for establishing fluid communication between the control chamber 334 and the outlet port 306.

With the various embodiments set forth above, enhancement of the hydraulic circuit in the active suspension system can be achieved.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. An actively controlled suspension system comprising:
   a hydraulic cylinder disposed between a vehicle body and a suspension member rotatably supporting a vehicular wheel, said hydraulic cylinder defining therein a working chamber;
   a pressure source means including a pump means associated with an automotive internal combustion engine to be driven by the output of said engine;
   a pressure control valve means having a first port connected to said working chamber, a second port connected to said pressure source means via a supply line and a third port connected to said pressure source means via a drain line, said pressure control valve means being variable of valve position for selectively establishing and blocking fluid communication between said first port and said second port and between said first port and said third port for adjusting fluid pressure in said working chamber for controlling suspension characteristics; and means for absorbing back pressure in said drain line.

2. An active suspension system as set forth in claim 1, which further comprises check valve means for disposed in said drain line and connected to said supply line for establishing fluid communication through said drain line when a line pressure in said supply line is held higher than or equal to a set pressure.

3. An active suspension system as set forth in claim 2, wherein said back pressure absorbing means is provided between said pressure control valve means and said check valve means.

4. An active suspension system as set forth in claim 3, wherein said back pressure absorbing means comprises a pressure accumulator.

5. An active suspension system as set forth in claim 3, wherein said check valve means comprises a pilot pressure operated operational one-way check valve, which has a pilot chamber to which the line pressure in said supply line is introduced for selectively establishing and blocking fluid communication through said drain line.

6. An active suspension system as set forth in claim 5, wherein said operational one-way check valve defines an inlet port connected to said pressure control valve via a first section of said drain line and an outlet port connected to a fluid reservoir in said pressure source, said operational one-way check valve further defining a communication path means for selectively establishing and blocking fluid communication between said pilot chamber and said inlet port.

7. An active suspension system as set forth in claim 6, wherein said operational one-way check valve includes a valve member movable between a first position for establishing fluid communication between said inlet and outlet ports of said check valve and a second position for blocking fluid communication between said inlet and outlet ports of said check valve, and said fluid communication path means establishes fluid communication between said pilot chamber and said inlet port when said valve member is in said second position and blocks fluid communication between said pilot chamber and said inlet port when said valve member is in said first position.

8. An active suspension system as set forth in claim 7, which further comprises a control unit associated with at least one sensor for monitoring preselected vehicle driving parameter, said control unit deriving a control signal for said pressure control valve means for operating the latter in a magnitude corresponding thereto, said control unit maintains operation for a given period of time after shutting down of main power supply.

9. An actively controlled suspension system comprising:
a first hydraulic cylinder disposed between a vehicle body and a first suspension member rotatably supporting a first vehicular wheel, said first hydraulic cylinder defining therein a first working chamber;
a second hydraulic cylinder disposed between a vehicle body and a second suspension member rotatably supporting a second vehicular wheel, said second hydraulic cylinder defining therein a second working chamber;
a pressure source means including a pump means associated with an automotive internal combustion engine to be driven by the output of said engine;
a first pressure control valve means having a first port connected to said working chamber, a second port connected to said pressure source means via a supply line and a third port for draining pressurized fluid, said first pressure control valve means being variable of valve position for selectively establishing and blocking fluid communication between said first port and said second port and between said first port and said third port for adjusting fluid pressure in said working chamber for controlling suspension characteristics; and a second pressure control valve means having a first port connected to said working chamber, a second port connected to said pressure source means via a supply line and a third port for draining pressurized fluid, said second pressure control valve means being variable of valve position for selectively establishing and blocking fluid communication between said first port and said second port and between said first port and said third port for adjusting fluid pressure in said working chamber for controlling suspension characteristics; and a drain line connected to a fluid reservoir in said pressure source means a common line commonly connecting said third ports of said first and second pressure control valve means to said drain line; and means, connected to said common line, for absorbing back pressure in said drain line.

10. An active suspension system as set forth in claim 9, which further comprises check valve means for disposed in said drain line and connected to said supply line for establishing fluid communication through said drain line when a line pressure in said supply line is held higher than or equal to a set pressure.

11. An active suspension system as set forth in claim 10, wherein said back pressure absorbing means is provided between said pressure control valve means and said check valve means.

12. An active suspension system as set forth in claim 11, wherein said back pressure absorbing means comprises a pressure accumulator.

13. An active suspension system as set forth in claim 12, wherein said check valve means comprises a pilot pressure operated operational one-way check valve, which has a pilot chamber to which the line pressure in said supply line is introduced for selectively establishing and blocking fluid communication through said drain line.

14. An active suspension system as set forth in claim 13, wherein said operational one-way check valve defines an inlet port connected to said pressure control valve via a first section of said drain line and an outlet port connected to a fluid reservoir in said pressure source, said operational one-way check valve further defining a communication path means for selectively establishing and blocking fluid communication between said pilot chamber and said inlet port.

15. An active suspension system as set forth in claim 14, wherein said operational one-way check valve includes a valve member movable between a first position for establishing fluid communication between said inlet and outlet ports of said check valve and a second position for blocking fluid communication between said inlet and outlet ports of said check valve, and said fluid communication path means establishes fluid communication between said pilot chamber and said inlet port when said valve member is in said second position and blocks fluid communication between said pilot chamber and said inlet port when said valve member is in said first position.

16. An active suspension system as set forth in claim 15, which further comprises a control unit associated with at least one sensor for monitoring preselected vehicle driving parameter, said control unit deriving a control signal for said pressure control valve means for operating the latter in a magnitude corresponding thereto, said control unit maintains operation for a given period of time after shutting down of main power supply.

17. In a hydraulic circuit for an actively controlled suspension system including a hydraulic cylinder disposed between a vehicle body and a suspension member rotatably supporting a vehicular wheel, said hydraulic cylinder defining therein a working chamber; a pressure source means including a pump means associated with an automotive internal combustion engine to be driven by the output of said engine, and a pressure control valve means having a first port connected to said working chamber, a second port connected to said pressure source means via a supply line and a third port connected to said pressure source means via a drain line, said pressure control valve means being variable of valve position for selectively establishing and blocking fluid communication between said first port and said second port and between said first port and said third port for adjusting fluid pressure in said working chamber for controlling suspension characteristics, a check valve means disposed in said drain line and connected to said supply line, for establishing fluid communication through said drain line when a line pressure in said supply line is held higher than or equal to a set pressure, comprising a pilot pressure operated operational one-way check valve, which has a pilot chamber to which the line pressure in said supply line is introduced for selectively establishing and blocking fluid communication through said drain line, which operational one-way check valve defines an inlet port connected to said pressure control valve via a first section of said drain line and an outlet port connected to a fluid reservoir in said pressure source, said operational one-way check valve further defining a communication path means for selectively establishing and blocking fluid communication between said pilot chamber and said inlet port.

18. An active suspension system as set forth in claim 17, wherein said operational one-way check valve includes a valve member movable between a first position for establishing fluid communication between said inlet and outlet ports of said check valve and a second position for blocking fluid communication between said inlet and outlet ports of said check valve, and said fluid communication path means establishes fluid communication between said pilot chamber and said inlet port when said valve member is in said second position and blocks fluid communication between said pilot chamber and said inlet port when said valve member is in said first position.

19. In a hydraulic circuit for an actively controlled suspension system including a hydraulic cylinder disposed between a vehicle body and a suspension member rotatably supporting a vehicular wheel, said hydraulic cylinder defining therein a working chamber; a pressure source means including a pump means associated with an automotive internal combustion engine to be driven by the output of said engine, and a pressure control valve means having a first port connected to said working chamber, a second port connected to said pressure source means via a supply line and a third port connected to said pressure source means via a drain line, said pressure control valve means being variable of valve position for selectively establishing and blocking fluid communication between said first port and said second port and between said first port and said third port for adjusting fluid pressure in said working chamber for controlling suspension characteristics, a check valve means disposed in said drain line and connected to said supply line, for establishing fluid communication through said drain line when a line pressure in said supply line is held higher than or equal to a set pressure, comprising a pilot pressure operated operational one-way check valve, which has a pilot chamber to which the line pressure in said supply line is introduced for selectively establishing and blocking fluid communication through said drain line, which operational one-way check valve defines an inlet port connected to said pressure control valve via a first section of said drain line and an outlet port connected to a fluid reservoir in said pressure source, and has manually operable means for manually establishing fluid communication between said inlet port and outlet port.

* * * * *